July 24, 1962 J. B. DOW 3,046,537
INDICATOR FOR ICE AND LIKE SUBSTANCES
Filed Sept. 18, 1959 6 Sheets-Sheet 2
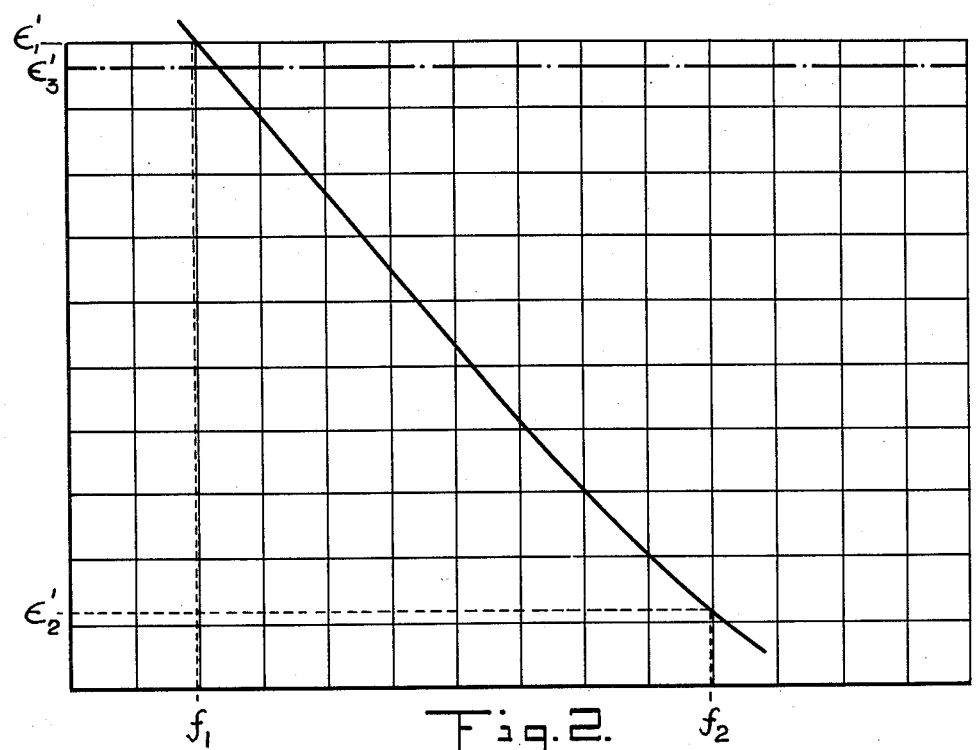
Fig.2.
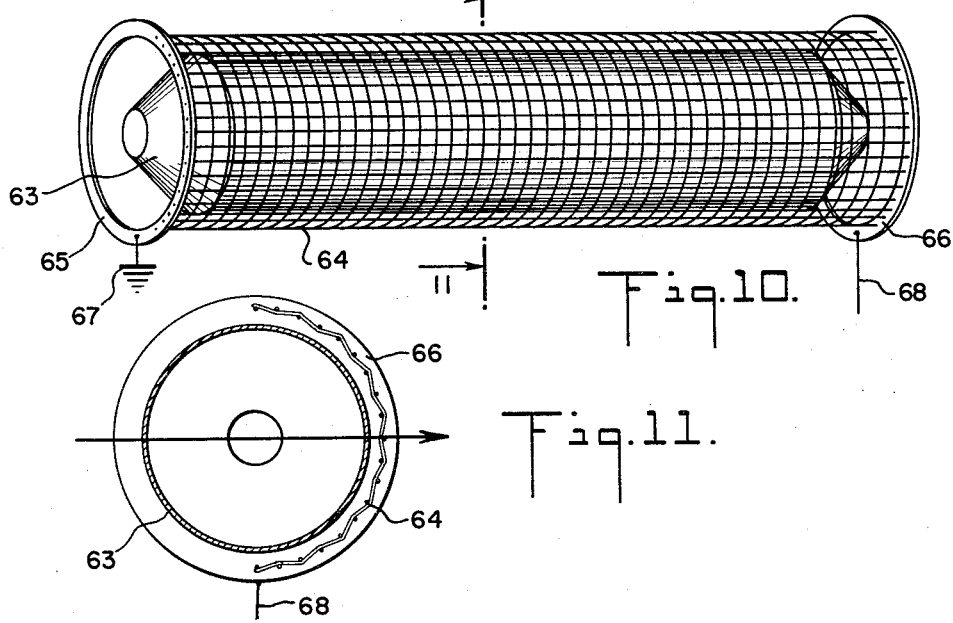
Fig.10.
Fig.11.

July 24, 1962 J. B. DOW 3,046,537
INDICATOR FOR ICE AND LIKE SUBSTANCES
Filed Sept. 18, 1959 6 Sheets-Sheet 4

July 24, 1962 J. B. DOW 3,046,537
INDICATOR FOR ICE AND LIKE SUBSTANCES
Filed Sept. 18, 1959 6 Sheets-Sheet 6

United States Patent Office 3,046,537
Patented July 24, 1962

3,046,537
INDICATOR FOR ICE AND LIKE SUBSTANCES
Jennings B. Dow, Glen Head, N.Y., assignor to Hazeltine Research, Inc., a corporation of Illinois
Filed Sept. 18, 1959, Ser. No. 840,858
18 Claims. (Cl. 340—234)

The icing of aircraft has long been a subject of importance to operators of aircraft as well as to aircraft designers.

The dangers in icing are due to (1) the increase in drag, (2) the addition of weight and loss of trim, and (3) the decrease in lift caused by loss of streamlining. Icing at engine intakes is also a source of some hazard since it results in a loss of engine power and a potential hazard due to ice breaking away and damaging engine blading.

The National Advisory Committee for Aeronautics reported in its Research Memorandum RM–E52J06, as a result of tests conducted upon four commercial aircraft flying the United States transcontinental route during January through May 1951, that icing was encountered during approximately 1.5 percent of the flying time. During this time, the rate of ice formation, as determined by ice-rate meters installed in these aircraft, varied from a negligible quantity to a maximum rate for one minute of 12 inches per hour. This was the upper limit of range of the meters used. The heaviest ice in a single encounter during these tests was calculated as slightly over 6 inches. Eighty percent of the measurements were in the range up to 5 inches per hour and the largest average rate for one hour was 10 inches.

A number of aerological conditions contribute to aircraft icing. Such conditions are usually encountered in an atmospheric water content of 0.1 to 5 grams per cubic meter and below freezing temperatures. Cloud formations are normally present, although icing has been reported with no visible evidence of clouds. The most serious form of icing results from the solidification of supercooled droplets of water having a mean diameter of 20 microns. Whether the ice is clear or white in appearance upon solidification of the droplets, is largely determined by the temperature of the aircraft at the point of impingement with the water droplets. Ice may also result from freezing rain or sleet at lower altitudes. It may also be encountered in the form of ice crystals which may extend for hundreds of miles along the flight path. Ice crystals normally bounce off the aircraft but may collect in ducts and engine intakes and cause difficulties under certain conditions.

It is the normal practice of aircraft to get out of icing conditions by increasing or decreasing altitude when such freedom of movement exists. However, the early detection of ice, which sometimes forms rapidly, presents a problem in the absence of suitable aids. The problem is accentuated in night flying under darkened ship conditions. Also, aircraft which do not have reserve engine power to quickly get out of bad icing conditions, are at a disadvantage.

The early detection of icing conditions is important and several systems have been proposed for this purpose. Their installation in aircraft has not been very general. Some, while suitable for research purposes, are not well adapted to general service use. Some are slow in functioning. Some electro-mechanical types admit water which may later freeze and cause malfunctioning. Others are prone to false indications in the presence of heavy rain or other causes. None, of knowledge, is self-checking in flight and none is known to provide means for the detection of ice crystals.

The present invention is based upon an examination of characteristics unique to ice as compared with other substances normally present with ice in aircraft operation, namely, air and water in liquid, droplet or vapor form. These characteristics manifest themselves in widely varying electrical properties, such as dielectric constant and resistivity at different frequencies. The usefulness of these unique characteristics for purposes of ice detection in aircraft operation, has apparently been overloooked heretofore.

Accordingly, it is an object of the present invention to provide an ice indicator for aircraft and the like which avoids many of the shortcomings of prior art ice indicators.

More specifically, it is an object of the invention to provide such an ice indicator which is simple in construction and which distinguishes more reliably between ice and other atmospheric substances, such as air and water in any other form than ice.

In accordance with the invention, a device for monitoring the presence of a particular physical state of a predetermined substance, which physical state is characterized by an electrical property varying widely with frequency, comprises first means for providing a characteristic dependent on the environment of the first means, which characteristic is affected by the aforementioned electrical property; means coupled to the first means for deriving signals indicative of the electrical property at each of two different frequencies; and means responsive to these signals for using presupplied information as to the variations of the electrical property with frequency of the particular state of the predetermined substance for deriving an indication of the presence of this state, which state may be present with other substances and other physical states of the same substance.

Also in accordance with the invention, the method of detecting airborne icing conditions comprising: obtaining a sample of the atmosphere in the vicinity of an object subject to relative motion of the surrounding atmosphere, which sample may contain changing amounts of ice and other forms of water; impressing upon this sample a plurality of alternating potentials each of a different frequency; deriving signals, which are some function of the dielectric constant of the sample, from the alternating currents through the sample resulting from the potentials; and using presupplied information as to the wide variation of dielectric constant with frequency which is peculiar to ice to interpret the derived signals to determine the presence of ice.

For a better understanding of the invention, reference may be had to the following description of several embodiments thereof; its scope will be pointed out in the appended claims.

Referring to the drawings:

FIGS. 1 and 2 are curves illustrating certain electrical properties of ice and other substances;

Electrical Properties

Figure 1:
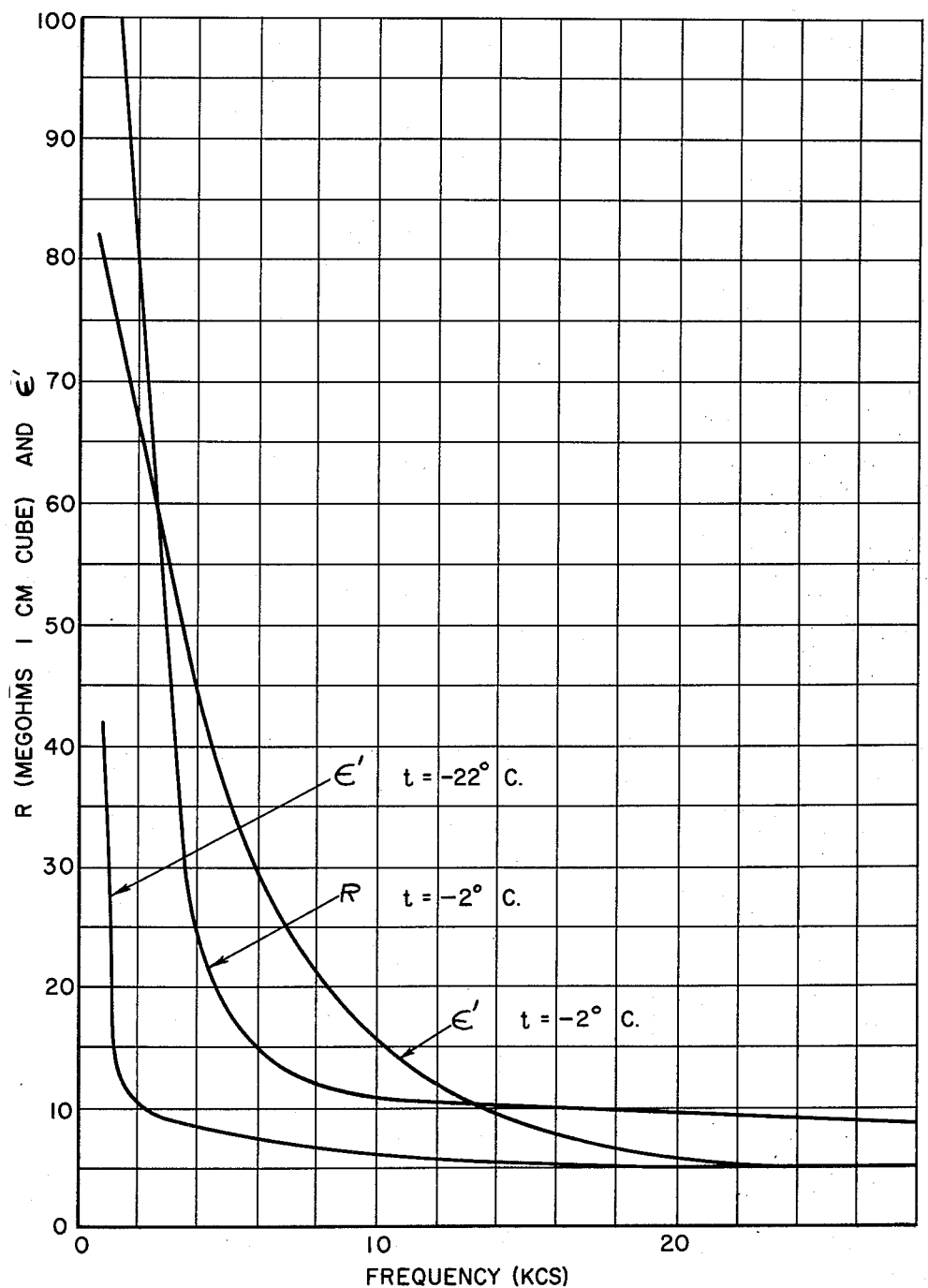

FIG. 1 is a plot against frequency of certain electrical properties of ice. Plots of the dielectric constant, $\epsilon'$, are shown for temperatures of $-2°$ C. and $-22°$ C. Also shown as a plot of the resistivity of ice at a temperature of $-2°$ C. Aircraft icing conditions are usually encountered within this range of temperatures, although icing may take place somewhat below $-22°$ C. or higher than $-2°$ C. In these latter cases, the shapes of the curves follow the same general pattern. The presence of small amounts of contaminants in the ice does not appear to affect the shapes of the curves to a significant extent insofar as utilization of the characteristics for present purposes is concerned.

The dielectric constant and resistivity of fresh water, while varying somewhat with temperature, are substantially constant and have values of approximately 78.2 and 600,000 ohms respectively over this same range of frequencies. Contaminants in water in liquid form do not materially affect the dielectric constant at frequencies under consideration, but may decrease the restivity. The resistivity once established in water by the contaminant does, however, retain reasonable constancy over the range of frequencies here considered.

The dielectric constant of water vapor up to the saturation point for a given temperature can be considered equal to unity and is constant over the frequency range under consideration. At a pressure of 60 pounds per square inch and a temperature of 145° C., the dielectric constant of water vapor is 1.00646. The restivity of water vapor at any pressure of present interest, when measured between parallel plate electrodes, is slightly greater than that for air. This is based upon measurements of breakdown potential. If the water vapor particles contain a significant number of ions, the breakdown potential is lowered but not to an extent of any present concern.

FIG. 2 is a portion of the plot of the dielectric constant of ice at −2° C. taken from FIG. 1. Also shown in FIG. 2 by the horizontal broken line at $\epsilon'_3$ is a plot of the dielectric constant of fresh water. If a capacitor were placed in the air stream of an aircraft and contained as a dielectric, a mixture of air, ice and water in substantial quantity, it would not be possible by a simple measurement of capacitance to determine the presence of ice since the existence of ice could be masked by the existence of water of higher dielectric constant.

If measurements of capacitance were made at two different frequencies, the contribution to capacitance by the air and water would be identical for the two frequencies, whereas that contributed by the ice would differ for the two frequencies. Capacitance measurements could, therefore, be made to detect the presence of ice. However, since the quantity of air, ice and water present in such a capacitor in air stream can all vary over wide limits, capacitance measurements for the detection of aircraft icing create many practical problems.

Figure 3:
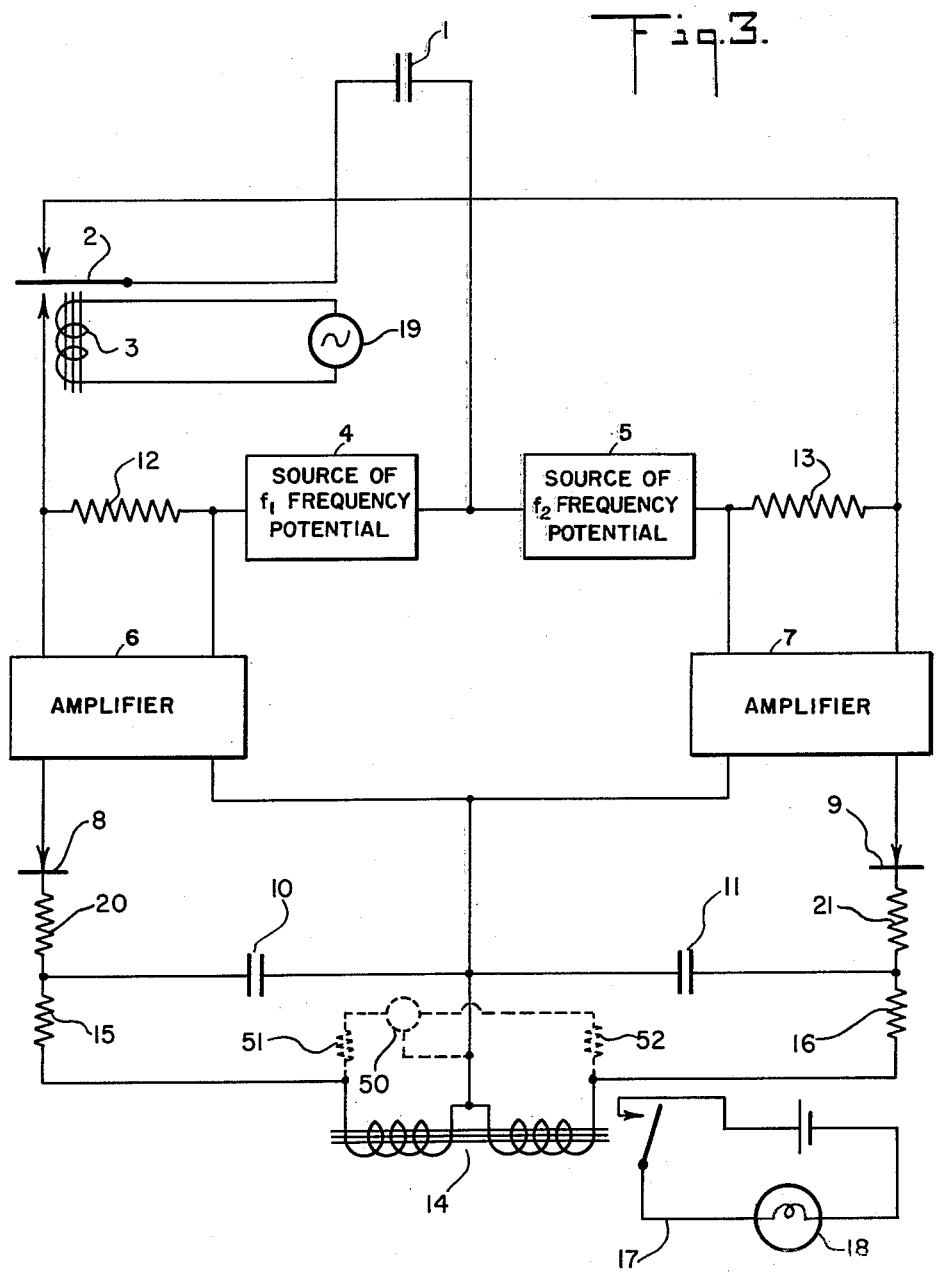
FIGS. 3 and 4 are circuit diagrams of illustrative systems constructed in accordance with the invention, and FIGS. 5–13, inclusive, illustrate forms of sensing capacitors which are useful in practicing the invention.

*The FIG. 3 System*

A simpler system for the detection of ice in accordance with the invention is shown in FIG. 3 where 1 is the sensing capacitor, 2 is a vibrator type switch operated by solenoid 3 and alternating current source 19. This switch may be of a motor driven commutator or other type. 4 and 5 are sources of alternating-current potential of frequencies $f_1$ and $f_2$. These sources are alternately and rapidly connected through resistors 12 and 13 of selected values through the vibrator type switch 2, to sensing capacitor 1. Amplifiers 6 and 7 amplify the alternating-current voltage drops across resistors 12 and 13. 12 and 13 may take the form of other types of impedances. Rectifiers 8 and 9 convert the output of amplifiers 6 and 7 to direct current for charging capacitors 10 and 11 through resistors 20 and 21. 14 is a differential relay, the coils of which are energized by the charge existing in capacitors 10 and 11, leaking through resistors 15 and 16. Relay 14 is so designed that when the currents flowing through the two coils are equal, the relay will remain open and when these currents differ by a predetermined amount, the relay will close, thus operating indicator circuit 17.

Sensing capacitor 1 may be considered to be a means for holding a sample of a substance such as the atmosphere through which an aircraft is passing, including ice or other forms of water which may be present in the device. FIGS. 5–13, inclusive, will illustrate specific forms of the device. Switch 2, resistors 12 and 13 and sources 4 and 5 may be considered to be means for deriving signals indicative of an electrical property of the sample at each of two different frequencies. Rectifiers 8 and 9, resistors 20 and 21, capacitors 10 and 11, resistors 15 and 16 and relay 14, together with indicator circuit 17, may be considered to be means responsive to said signals for deriving an indication of the difference in said property of the same at the different frequencies.

When the sensing capacitor 1 contains air, water vapor, water droplets or rain, the currents through the two relay coils 14 can be made equal for all practical purposes for the two frequencies $f_1$ and $f_2$ by suitable choice of circuit constants to be explained in more detail.

When ice is present in the sensing capacitor, the currents through the two coils of relay 14 will differ causing the relay to close and energize indicator lamp 18.

Figure 4:
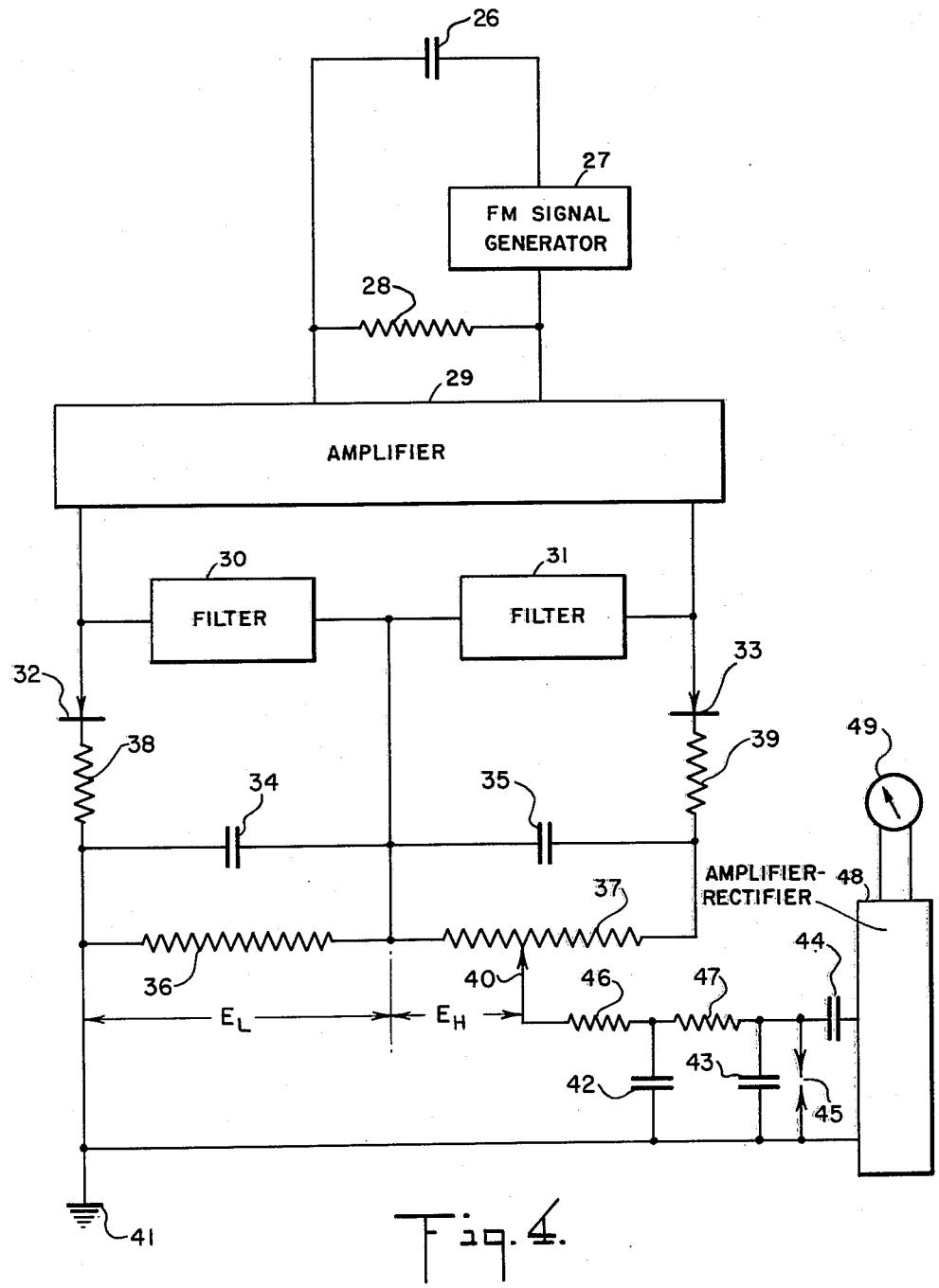

*The FIG. 4 System*

FIG. 4 shows another form of this general family of circuits for the detection of icing conditions. This circuit utilizes a single source of frequency modulated signals and a single amplifier. The arrangement has certain advantages over that in FIG. 3 from the point of view of ease of adjustment and maintenance of adjustment. In FIG. 4, 26 is the sensing capacitor and 27 is the frequency modulated signal generator which sweeps between two frequencies $f_1$ and $f_2$. The voltages to be amplified result from the RI drop across resistor 28. 29 is the amplifier. Filters 30 and 31 are designed respectively to have a high impedance at $f_1$ and $f_2$ and respectively a low impedance at $f_2$ and $f_1$. 32 and 33 are diode rectifiers and 34 and 35 are capacitors for storing the respective average D.C. charges resulting from the flow of rectified current from rectifiers 32 and 33 through resistors 38 and 39. 36 and 37 are resistors across which voltages to be measured are established. It should be noted that the currents through resistors 36 and 37 flow in opposite directions. Resistor 37 is arranged as a potentiometer by means of tap 40 for reasons explained below. 41 is a ground connection to the vehicle in which the system is installed. Resistors 46 and 47, capacitors 42, 43 and 44, vibrating contacts 45, and amplifier-rectifier 48 comprise a conventional D.C. voltage amplifier, the output of which is utilized to operate indicator 49 which may take many obvious forms. Tap 40 provides a convenient adjustment for compensating to a degree at least for some disparities which may exist in the output voltages from signal generator 27, linearity of amplifier 29, disparity in the two filters 30 and 31 and rectifiers 32 and 33. Tap 40 may also be utilized to make $$\frac{E_H}{E_L}=1$$

in the absence of ice. It should be noted that these latter voltages are opposite in sense and in this latter event, their sum would have zero value.

*Operation of FIGS. 3 and 4*

In the operation of FIG. 3, the rapid switching of switch 2 between its contacts causes the potentials of sources 4 and 5 to be applied alternately, but substantially simultaneously, to circuits embracing capacitor 1 so that currents, proportional to those potentials, flow through capacitor 1 at the respective frequencies and potentials, proportional to these currents, may be derived across resistors 12 and 13. The latter potentials, after amplification by amplifiers 6 and 7, and rectification by rectifiers 8 and 9, are compared in relay 14. If ice is present in capacitor 1, the fact will be indicated by closing of relay 14 due to the difference in the potentials applied to it and consequent lighting of indicator lamp 18.

In operation of FIG. 4, potentials proportional to the current flow through capacitor 26 at frequencies $f_1$ and $f_2$ are developed across resistor 28 and are subsequently selected by filters 30 and 31 respectively because of their impedance characteristics. These potentials are then rectified by rectifiers 32 and 33 and create a current flow through resistors 36 and 37 where the resulting potential drops may be made to operate an indicator 49 in a manner generally similar to the case of FIG. 3.

In explaining the operation of the circuits of FIGS. 3 and 4, it is convenient to start by defining the following in terms of CGS electrostatic units, $A$=dielectric area of sensing capacitor (cm.$^2$)
$d$=dielectric thickness
$\gamma_1$=conductivity of dielectric per cm.$^3$ at frequency $f_1$ in c.p.s.
$\gamma_2$=conductivity of dielectric per cm.$^3$ at frequency $f_2$ in c.p.s.
$R_{12}$=resistance of resistor 12
$R_{13}$=resistance of resistor 13
$\gamma_{12}$=conductance of resistor 12
$\gamma_{13}$=conductance of resistor 13
$I_1$=R.M.S. current through resistance $R_{12}$ resulting from R.M.S. potential $E_1$ supplied by alternating potential source 4
$I_2$=R.M.S. current through resistance $R_{13}$ resulting from R.M.S. potential $E_2$ supplied by alternating potential source 5
$\epsilon'_1$=dielectric constant of the medium at frequency $f_1$ in c.p.s., averaged over total dielectric area
$\epsilon'_2$=dielectric constant of the medium at frequency $f_2$ in c.p.s., averaged over total dielectric area
$E_1$=R.M.S. potential supplied by alternating-current source 4
$E_2$=R.M.S. potential supplied by alternating-current source 5
$V_1$=R.M.S. potential across resistance $R_{12}$
$V_2$=R.M.S. potential across resistance $R_{13}$ Referring now to the circuit of FIG. 3, amplifiers 6 and 7 can be designed to provide any desired amplification so that resistances 12 and 13 may be made as small as one chooses and at least to the extent that the currents flowing through resistances 12 and 13 are determined solely by the impedance of sensing capacitor 1. This is not a requirement for the system but it simplifies an explanation of system fundamentals.

With the above negligibility condition in mind, one can state that, $$V_1 = I_1 R_{12} = E_1 R_{12} \frac{A}{d} \sqrt{\gamma_1^2 + \left(\frac{\epsilon'_1}{2} f_1\right)^2} \quad (1)$$

and $$V_2 = I_2 R_{13} = E_2 R_{13} \frac{A}{d} \sqrt{\gamma_2^2 + \left(\frac{\epsilon'_2}{2} f_2\right)^2} \quad (2)$$

If one makes $E_1 = E_2$ to further simplify the explanation, then, $$\frac{V_1}{V_2} = \frac{R_{12} \sqrt{\gamma_1^2 + \left(\frac{\epsilon'_1}{2} f_1\right)^2}}{R_{13} \sqrt{\gamma_2^2 + \left(\frac{\epsilon'_2}{2} f_2\right)^2}} \quad (3)$$

If the dielectric space of sensing capacitor 1 is free of ice and contains as a dielectric, a mixture of air and water droplets in proportions likely to be encountered under icing conditions, it can be assumed that due to rapid switching by vibrator switch 2, $\gamma_1 = \gamma_2 = \gamma$ and $\epsilon'_1 = \epsilon'_2 = \epsilon'$, so that, $$\frac{V_1}{V_2} = \frac{R_{12} \sqrt{1 + \left(\frac{\epsilon'}{2\gamma} f_1\right)^2}}{R_{13} \sqrt{1 + \left(\frac{\epsilon'}{2\gamma} f_2\right)^2}} \quad (4)$$

Under these conditions, $\gamma$ is very small and since $\epsilon'$ cannot be less than unity, $$\left(\frac{\epsilon'}{2\gamma} f\right)^2 \gg 1 \quad ( )$$

Under this condition and in the absence of ice in the dielectric space, (4) reduces to $$\frac{V_1}{V_2} = \frac{R_{12} f_1}{R_{13} f_2} \quad (6)$$

If one makes $$\frac{R_{12}}{R_{13}} = \frac{f_2}{f_1}$$

the currents through the two coils of relay 14 in FIG. 3 will be equal and there will be no response in the indicator circuit 17.

The validity of (6) assumes a design of sensing capacitor such that water cannot accumulate in the dielectric space. With reasonable attention to such design, this imposes no problem in an air stream.

In contrast with water, ice will accumulate in the dielectric space of a properly designed sensing capacitor with the result that for ice the potentials $V_1$ and $V_2$ across resistors 12 and 13 are as stated in Expressions 1 and 2. Assuming that one makes $E_1 = E_2$, the ratio of these potentials is given by Expression 3.

Although Expressions 1 and 2 yield absolute values of R.M.S. potentials across resistors 12 and 13 in terms of CGS electrostatic units, the circuit analysis has been directed to the ratio $V_1/V_2$. The stated effect upon relay 14 has assumed uniform response to potentials $V_1$ and $V_2$ by the two branches of the circuit of FIG. 3 which begin at the input terminals of amplifiers 6 and 7. Any non-uniformity in this response may be corrected within the two circuit branches by providing trimmers or other adjusting means well known in the art.

It is desirable to select values for resistances 15 and 20 and capacitance 10 such that a circuit time constant of two or more seconds is provided. The same applies in selecting values for resistances 16 and 21 and capacitance 11, and the corresponding portions of the circuit of FIG. 4.

Expressions 1 through 6 are equally applicable in describing the operation of the circuit of FIG. 4. However, in applying these expressions to FIG. 4, one must make $R_{12} = R_{13} = R_{28}$ where $R_{28}$ is the value of the resistance designated by reference character 28. Tap connection 40 in FIG. 4 may be utilized to provide the result obtained in the circuit of FIG. 3 by making $$\frac{R_{12}}{R_{13}} = \frac{f_2}{f_1}$$

This relationship was not a requirement for the circuit of FIG. 3 since one could have made $R_{12} = R_{13}$ and at the same time modified the turns ratio in the coils of relay 14, to obtain the same result insofar as indicator circuit 17 was concerned. Examination of Expressions 1 and 2 will disclose that the same result also could have been obtained by appropriate selection of $E_1$ and $E_2$ other than $E_1 = E_2$.

The system inherently possesses certain advantageous self-checking features. It should be noted that the circuits are arranged to continuously balance the magnitude of supplied alternating potentials and derived D.C. potentials against their counterparts in opposite branches of the circuits. Under fair weather flying conditions, the indicator of FIG. 4 may be adjusted to read a normal and constant value determined by the position of tap 40. Any significant change in circuit constants which would cause malfunctioning of the indicator in the presence of ice would be detected in advance of icing encounters. Such malfunctioning would manifest itself in the form of a zero reading of the indicator in the case of power failure or a reading above or below normal for any change of importance in circuit constants. This self-checking feature includes that covering any deterioration in the insulation resistance of the sensing capacitor which would upset the negligibility requirement defined by Expression 5. In the circuit of FIG. 3, this self-checking feature may be incorporated by the use of a zero-center D.C. millivoltmeter 50 and resistances 51 and 52 connected as shown by dotted lines. The values of resistances 51 and 52 are preferably selected to show an indication differing somewhat from zero under fair weather flying conditions.

Only two types of indicator circuits have been disclosed, namely, one based upon the use of a differential relay in FIG. 3 and that based upon the use of a D.C. amplifier in FIG. 4. Many types of indicator circuits may obviously be used depending upon the need. For example, when utilizing the system to determine the freezing point of fluids as well as the elapsed time in passing from the fluid to solid state, it is convenient to employ a cathode-ray tube oscilloscope and recorder with provision for both temperature and time marking.

Figures 5, 6:
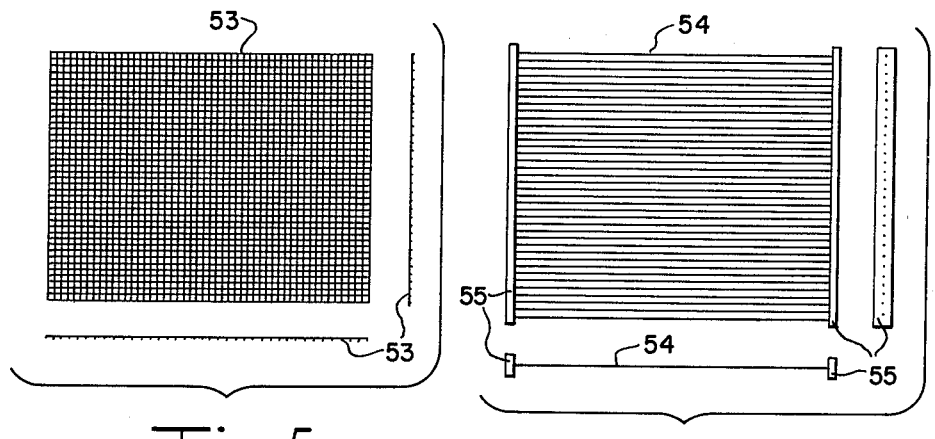
Figure 7:
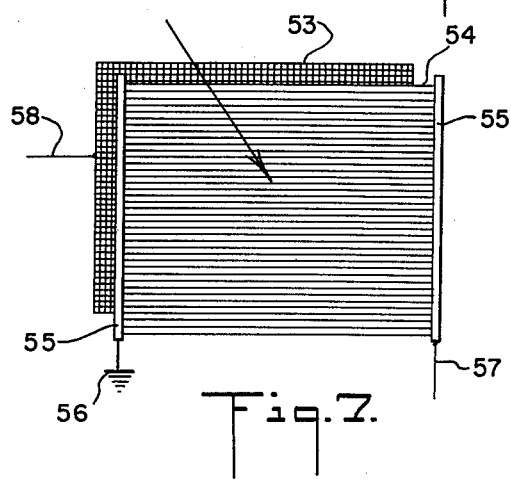

FIGS. 5 through 9, inclusive, illustrate one form which sensing capacitors 1 and 26 may take. FIG. 5 shows a screen-like structure 53 in three views which constitutes one plate of a two plate capacitor. FIG. 6 shows a second screen-like structure 54 which constittues the other plate of a two plate capacitor. Whereas, in the case of 53, the screen is a woven structure, 54 shows a system of parallel wires which terminate in end supports 55. FIG. 7 illustrates the positioning of the two plates with respect to the flight path of the aircraft which is indicated by an arrow. In practice, capacitor plate 53 is maintained rigidly at a fixed distance of a few millimeters from, parallel to, and insulated from capacitor plate 54. The insulating supports for capacitor plate 53 are not shown. The capacitor plates 53 and 54 are constructed of metallic wires or rods to take advantage of the ice collecting properties of structures having a small radius of curvature. It is preferable that the wire spacing in capacitor plate 53 be approximately one-half of the wire spacing in capacitor plate 54. While 53 is shown in the form of a screen and 54 in the form of parallel wires, both capacitor plates may be of screen or parallel wire construction. In operation, water droplets pass through capacitor plate 54 and impinge and freeze upon the leading edges of the wires of screen 53. As the ice accumulates, it tends to fill up the dielectric space between the two capacitor plates. Some of the water droplets will impinge and freeze upon the leading edges of the wires of capacitor plate 54. This is undesirable since such ice would tend to block the passage of water droplets into the dielectric space. To minimize the formation of ice upon capaictor plate 54, there are provided a ground connection 56 and a second connection 57 which, together with a source of electric power not shown, provide means for passing a current through the wires of capacitor plate 54 for slightly heating said capacitor plate, thus retarding the formation of ice on this plate.

By increasing the flow of current through the wires of capacitor plate 54 to a relatively high value, it is possible to melt the ice in the dielectric space. This places the sensing capacitor in a position of readiness for detecting subsequent ice encounters. Such heating provision in one form or another is considered a necessity for all designs of sensing capacitors.

Figures 8, 9:
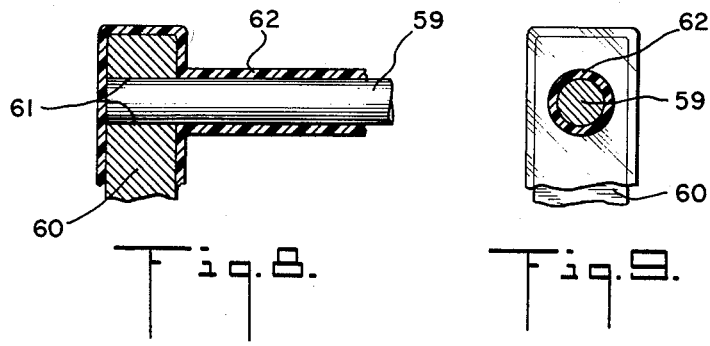

It is desirable to provide means for satisfying the negligibility requirement of Expression 5 in the presence of intermittent slugs of water which may be encountered at low altitudes. When the design of the sensing capacitor is such as to provide close spacing of the capacitor plates 53 and 54, it has been found desirable to coat one of the plates with an insulating material. Several plastic compounds are available for this purpose. These may be spray coated, moulded upon or provided in the form of adhesive films, depending upon the particular design of sensing capacitor. FIGS. 8 and 9 show cross-sectional views of the termination of one of the wires of capacitor plate 54 in metallic end support 55. In FIGS. 8 and 9, one of the wires 59 terminates in end support 55 which is shown in cross-section by 60. The wire in this case is held in position by a solder connection 61. 62 is a cross-section of the insulating coating which extends over the end support 60. In FIG. 9, the insulating coating is shown as transparent. Such insulating coatings are preferably 0.002 to 0.004 inch in thickness. The conductivity of atmospheric water is such that some deterioration of the insulating coating in the form of pinholes or wear may take place without undesirable effect.

The proper selection of the time constants of the circuit embraced by resistors 15 and 20 and capacitor 10 and their counterpart circuits, as previously mentioned, also aids in guarding against the effects of intermittent slugs of water which may be encountered at low altitudes.

FIGS. 10 and 11 show another form which sensing capacitors 1 and 26 may take. In this case, the capacitor comprises a hollow metallic cylinder 63 with truncated ends. The cylinder forms one plate of the capacitor. The second plate of the capacitor consists of a metallic screen 64 extending part way around the circumference of cylinder 63 and separated from it by the desired dielectric space. Screen 64 terminates in metallic end rings 65 and 66. The ends of the cylinder are truncated to provide for the maximum insulation leakage resistance across insulating support plates for the cylinder and screen. These support plates are not shown in the drawing.

As was the case in connection with FIGS. 6, 7, 8 and 9, the metallic screen 64 in FIGS. 10 and 11 is coated with a film of insulating material. Screen 64 is also provided with a ground connection 67 and a second connection 68 to provide heating means for the purposes described in connection with FIG. 7.

Figure 12:
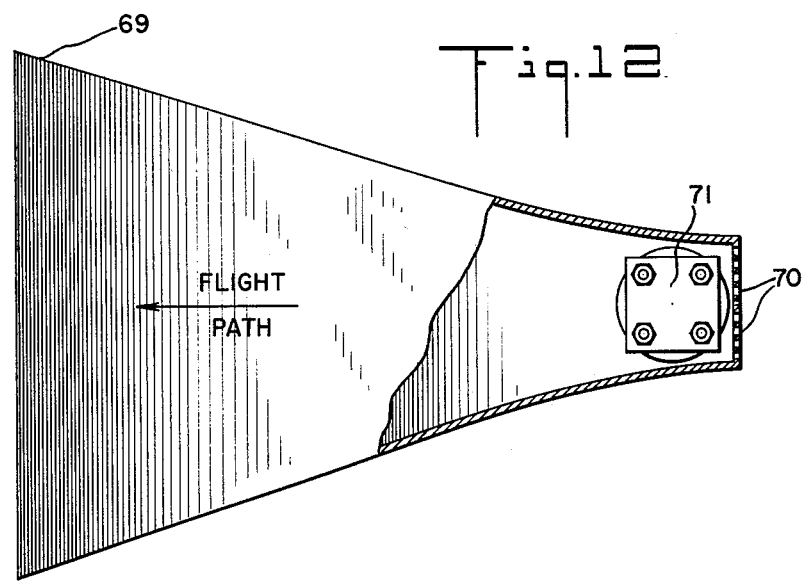
Figure 13:
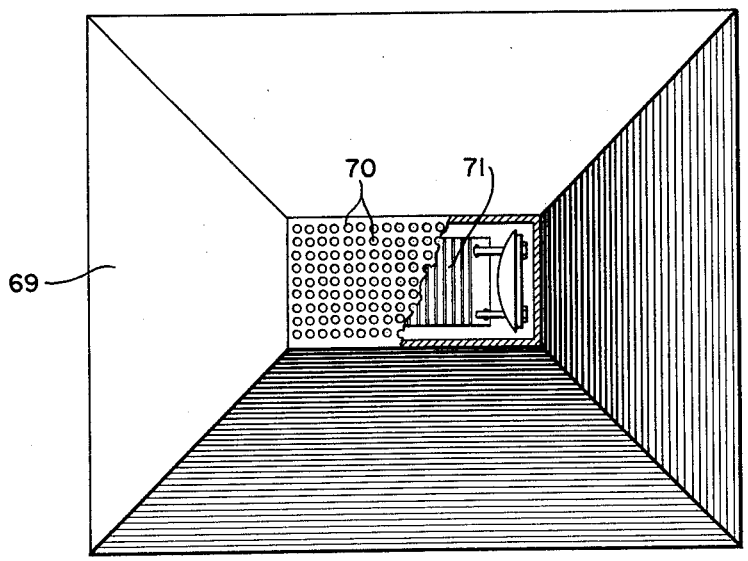

FIGS. 12 and 13 show an arrangement of the sensing capacitor for the detection of ice crystals which often exist at high altitudes at temperatures below −25° C. In FIGS. 12 and 13, 69 is a horn-like collector of ice crystals. Horn 69 has a perforated end plate 70 which permits the exit of air in such manner that the ice crystals collect in the dielectric space of the sensing capacitor 71 positioned at the small end of the horn. In this case, sensing capacitor 71 is a system of parallel plates each of which is separated from adjacent ones by a few millimeters. The design of such a sensing capacitor may conform to that of a conventional parallel plate air dielectric fixed capacitor although it may take other forms.

A requirement for detecting the formation of ice in several locations may exist in the case of large aircraft. Two or more sensing capacitors may be utilized by connecting them in parallel or by the provision for selection by switching. The circuit of FIG. 4 lends itself well to the use of sensing capacitors in parallel. In this case, additional frequency channels may be provided if desired by the use of more than two filters such as 30 and 31.

The use of two filters 30 and 31 is intended to be illustrative and not restrictive. The impedance characteristics of ice and other crystalline solids are such that for some applications of the system, no filter is required in the circuit of FIG. 4. For some uses of the system, it is desirable to use one or more filters with band pass or band elimination characteristics of particular shapes.

While there is described in the foregoing what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An ice indicator comprising: a sensing capacitor adapted to have ice and other forms of water as a dielectric; means for substantially simultaneously impressing upon said sensing capacitor a plurality of alternating potentials each of different frequency; means for deriving alternating potentials proportional to the current flow through said sensing capacitor resulting from said plurality of potentials; and means for utilizing the derived alternating potentials to operate an indicator.

2. An ice indicator comprising: a sensing capacitor adapted to have ice and other forms of water as a dielectric; means for impressing upon said sensing capacitor a frequency modulated potential; means for deriving a plurality of alternating potential components of said frequency modulated potential which components have magnitudes which are functions of the current flowing through said sensing capacitor; and means for utilizing said alternating potential components to automatically indicate the presence of ice which may be present with other forms of water and other substances.

3. An ice indicator comprising: a sensing capacitor adapted to have ice and other forms of water as a dielectric; means for substantially simultaneously impressing upon said sensing capacitor a plurality of alternating potentials each of different frequency; means for deriving alternating potentials proportional to the current flow through said sensing capacitor resulting from said plurality of potentials; means for amplifying the derived alternating potentials; means for rectifying the amplified potentials; and means for utilizing the rectified potentials to operate an indicator.

4. An ice indicator comprising: a sensing capacitor adapted to have ice and other forms of water as a dielectric; means for substantially simultaneously impressing upon said sensing capacitor a plurality of alternating potentials each of different frequency; means for deriving alternating potentials proportional to the current flow through said sensing capacitor resulting from said plurality of potentials; means for amplifying the derived alternating potentials; means for rectifying the amplified potentials; capacity means for storing charges proportional to the magnitude of the rectified potentials and time; and means for utilizing said stored charges to operate an indicator.

5. An ice indicator comprising: a sensing capacitor adapted to have ice and other forms of water as a dielectric; means for substantially simultaneously impressing upon said sensing capacitor a plurality of alternating potentials each of different frequency; means for deriving alternating potentials proportional to the current flow through said sensing capacitor resulting from said plurality of potentials; means for amplifying the derived alternating potentials; means for rectifying the amplified potentials; capacity means for storing charges proportional to the magnitude of the rectified potentials and time; and means for utilizing said stored charges to operate an indicator, said last-mentioned means including a differential relay.

6. An ice indicator comprising: a sensing capacitor adapted to have ice and other forms of water as a dielectric; means for substantially simultaneously impressing upon said sensing capacitor a plurality of alternating potentials each of different frequency; means for deriving alternating potentials proportional to the current flow through said sensing capacitor resulting from said plurality of potentials; means for amplifying the derived alternating potentials; means for rectifying the amplified potentials; capacity means for storing charges proportional to the magnitude of the rectified potentials and time; and means for utilizing said stored charges to operate an indicator, said last-mentioned means including a D.C. amplifier.

7. An ice indicator comprising: a sensing capacitor adapted to have ice and other forms of water as a dielectric; means for impressing upon said sensing capacitor a frequency modulated potential; means for deriving a plurality of alternating potential components of said frequency modulated potential which components have magnitudes which are functions of the current flowing through said sensing capacitor; means for rectifying said alternating potential components; and means for utilizing the rectified components to operate an indicator.

8. An ice indicator comprising: a sensing capacitor adapted to have ice and other forms of water as a dielectric; means for impressing upon said sensing capacitor a frequency modulated potential; means for deriving a plurality of alternating potential components of said frequency modulated potential which components have magnitudes which are functions of the current flowing through said sensing capacitor; means for rectifying said alternating potential components; capacitor means for storing charges which are a function of the magnitude of the rectified components; and means for utilizing the stored charges to operate an indicator circuit.

9. An ice indicator comprising: a sensing capacitor adapted to have ice and other forms of water as a dielectric; means for impressing upon said sensing capacitor a frequency modulated potential; means for deriving a plurality of alternating potential components of said frequency modulated potential which components have magnitudes which are functions of the current flowing through said sensing capacitor; means for rectifying said alternating potential components; capacitor means for storing charges which are a function of the magnitude of the rectified components; and means for utilizing the stored charges to operate an indicator circuit, said indicator circuit including a D.C. amplifier and an indicating device.

10. A device for monitoring the presence of a particular physical state of a predetermined substance, which physical state is characterized by an electrical property varying widely with frequency, comprising: first means for providing a characteristic dependent on the environment of said means, which characteritic is affected by said electrical property; means coupled to said first means for deriving signals indicative of said electrical property at each of two different frequencies; and means responsive to said signals for using presupplied information as to the variations of said electrical property with frequency of said particular state of said predetermined substance for deriving an indication of the presence of said state, which state may be present with other substances and other physical states of the same substance.

11. A device for monitoring the presence of a particular physical state of a predetermined substance, which physical state is characterized by a dielectric constant varying widely with frequency, comprising: first means for providing an electrical characteristic dependent on the environment of said means, which electrical characteristic is affected by said dielectric constant; means coupled to said first means for deriving signals indicative of said dielectric constant at each of two different frequencies; and means responsive to said signals for using presupplied information as to the variations of said dielectric constant with frequency of said particular state of said predetermined substance for deriving an indication of the presence of said state, which may be present with other substances and other physical states of the same substance.

12. A device for monitoring the presence of ice comprising: a sensing capacitor adapted to have ice and other forms of water as a dielectric; means coupled to said capacitor for deriving signals indicative of said dielectric constant at each of two different frequencies; and means responsive to said signals for using presupplied information as to the variations of the dielectric constant of ice with frequency for automatically deriving an indication of the presence of ice which may be present with other substances and other physical states of water.

13. An ice indicating system comprising: a body, exposed to relative motion of the surrounding atmosphere, on which ice may form; first means coupled to said body for obtaining a sample of the atmosphere, which sample may contain changing amounts of ice and other forms of water; means coupled to said first means for deriving signals indicative of the dielectric constant of the sample at each of two different frequencies; and means responsive to said signals for using presupplied information as to the wide variation of dielectric constant with frequency which is peculiar to ice, for deriving an indication of the presence of ice.

14. An ice indicating system comprising: a body exposed to relative motion of the surrounding atmosphere on which ice may form; a sensing capacitor adapted to have ice and other forms of water as a dielectric; means coupled to said capacitor for deriving signals indicative of the dielectric constant of the sample at each of two different frequencies; and means responsive to said signals for using presupplied information as to the wide variation of dielectric constant with frequency which is peculiar to ice for automatically deriving an indication of the presence of ice.

15. The method of detecting airborne icing conditions comprising: obtaining a sample of the atmosphere in the vicinity of an object subject to relative motion of the surrounding atmosphere, which sample may contain changing amounts of ice and other forms of water; impressing upon said sample a plurality of alternating potentials each of a different frequency; deriving signals, which are some function of the dielectric constant of said sample from the alternating currents through the sample resulting from said potentials; and using presupplied information as to the wide variation of dielectric constant with frequency which is peculiar to ice to interpret said derived signals to determine the presence of ice.

16. The method of detecting airborne icing conditions comprising: obtaining a sample of the atmosphere in the vicinity of an object subject to relative motion of the surrounding atmosphere, which sample may contain changing amounts of ice and other forms of water; impressing upon said sample a frequency modulated potential; selectively filtering out two or more frequency bands of alternating potential components, which are some function of the dielectric constant of said sample, from the current flow through the sample resulting from said frequency modulated potential; rectifying said components; and using presupplied information as to the wide variation of dielectric constant with frequency which is peculiar to ice to interpret said rectified components to determine the presence of ice.

17. The method of preventing undesirable ice formations on an object exposed to the atmosphere comprising: obtaining a sample of the atmosphere in the vicinity of said object, which sample may contain changing amounts of ice and other forms of water; impressing upon said sample a plurality of alternating potentials each of a different frequency; deriving signals, which are some function of the dielectric constant of said sample, from the alternating currents through said sample resulting from said potentials; using presupplied information as to the wide variation of dielectric constant with frequency which is peculiar to ice to interpret said derived signals to determine the presence of ice; and actuating ice removal apparatus to as to prevent undesirable ice formation on exposed surfaces of said object.

18. The method of preventing undesirable ice formations on an object exposed to the atmosphere comprising: obtaining a sample of the atmosphere in the vicinity of said object, which sample may contain changing amounts of ice and other forms of water; impressing upon said sample a frequency-modulated potential; selectively filtering out two or more frequency bands of alternating potential components, which are some function of the dielectric constant of said sample, from the current flow through said sample resulting from said frequency modulated potential; using presupplied information as to the wide variation of dielectric constant with frequency which is peculiar to ice to interpret the said filtered-out components to determine the presence of ice; and actuating ice removal apparatus so as to prevent undesirable ice formation on exposed surfaces of said object.

References Cited in the file of this patent

UNITED STATES PATENTS

| | | |
|---|---|---|
| 2,112,826 | Cook | Apr. 5, 1938 |
| 2,395,425 | Osborne | Feb. 26, 1946 |
| 2,454,687 | Baughman | Nov. 23, 1948 |
| 2,516,768 | Grob et al. | July 25, 1950 |
| 2,766,421 | Wait et al. | Oct. 9, 1956 |
| 2,929,020 | Mayes | Mar. 15, 1960 |